United States Patent [19]
Ogura

[11] Patent Number: 6,130,440
[45] Date of Patent: Oct. 10, 2000

[54] IMAGE READING APPARATUS

[75] Inventor: Nobuhiko Ogura, Kanagawa-ken, Japan

[73] Assignee: Fuji Photo Film Co., Ltd., Kanagawa-ken, Japan

[21] Appl. No.: 09/010,142

[22] Filed: Jan. 21, 1998

[30] Foreign Application Priority Data

Jan. 30, 1997 [JP] Japan ................................. 9-017164

[51] Int. Cl.⁷ ................................................ G03B 42/08
[52] U.S. Cl. ........................... 250/586; 250/583; 250/585
[58] Field of Search ................................. 250/586, 585, 250/583

[56] References Cited

U.S. PATENT DOCUMENTS

| | | | |
|---|---|---|---|
| 4,410,799 | 10/1983 | Okamoto | 250/586 |
| 4,733,307 | 3/1988 | Watanabe | 347/263 |
| 4,855,597 | 8/1989 | Shimura | 250/585 |
| 4,864,132 | 9/1989 | Adachi et al. | 250/584 |
| 4,893,012 | 1/1990 | Agano et al. | 250/585 |
| 5,528,050 | 6/1996 | Miller et al. | 250/585 |

FOREIGN PATENT DOCUMENTS

| | | |
|---|---|---|
| 55-12429 | 1/1980 | Japan . |
| 55-116340 | 9/1980 | Japan . |
| 55-163472 | 12/1980 | Japan . |
| 56-11395 | 2/1981 | Japan . |
| 56-104645 | 8/1981 | Japan . |
| 59-15843 | 1/1984 | Japan . |
| 61-51738 | 3/1986 | Japan . |
| 61-93538 | 5/1986 | Japan . |
| 1-60782 | 12/1989 | Japan . |
| 1-60784 | 12/1989 | Japan . |
| 4-3952 | 1/1992 | Japan . |

*Primary Examiner*—Constantine Hannaher
*Attorney, Agent, or Firm*—Sughrue, Mion, Zinn, Macpeak & Seas, PLLC

[57] ABSTRACT

An image reading apparatus includes three laser stimulating ray sources for emitting a laser beam, a laser beam scanner for scanning the laser beam, a light detector for photoelectrically detecting light released from an image carrier carrying an image, a scan starting point detector for detecting the laser beam and detecting a scan starting point in a main scanning direction, a laser power adjuster for adjusting power of the laser beam to be projected onto the image carrier in accordance with the kind of the image carrier and a gain switch for switching gain of the scan starting point detector in accordance with the kind of the laser beam and the kind of the image carrier. According to the thus constituted image reading apparatus, it is possible to accurately detect a scan starting point in a main scanning direction of a laser beam to read an image in a radiation diagnosis system, an autoradiographic system, an electron microscope detecting system and a radiation diffraction image detecting system using a stimulable phosphor and a fluorescence detecting system.

12 Claims, 4 Drawing Sheets

IMAGE READING APPARATUS

BACKGROUND OF THE INVENTION

The present invention relates to an image reading apparatus and, particularly, to such an apparatus which can be used for a radiation diagnosis system, an autoradiographic system, an electron microscope detecting system and a radiation diffraction image detecting system using a stimulable phosphor and a fluorescence detecting system and can accurately detect a scan starting point in a main scanning direction of a laser beam to read an image.

DESCRIPTION OF THE PRIOR ART

There is known a radiation diagnosis system comprising the steps of employing, as a detecting material for the radiation, a stimulable phosphor which can absorb and store the energy of radiation upon being irradiated therewith and release a stimulated emission whose amount is proportional to that of the received radiation upon being stimulated with an electromagnetic wave having a specific wavelength range, storing and recording the energy of radiation transmitted through an object in the stimulable phosphor contained in a stimulable phosphor layer formed on a stimulable phosphor sheet, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Application Laid Open Nos. 55-12429, 55-116340, 55-163472, 56-11395, 56-104645 and the like).

There is also known an autoradiography system comprising the steps of employing a similar stimulable phosphor as a detecting material for the radiation, introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on displaying means such as a CRT or the like or a photographic film (see for example, Japanese Patent Publication No. 1-60784, Japanese Patent Publication No. 1-60782, Japanese Patent Publication No. 4-3952 and the like).

There are further known an electron microscope detecting system and a radiographic diffraction image detecting system comprising the steps of employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development which is chemical processing, becomes unnecessary. Further, it is possible to reproduce a desired image by effecting image processing on the obtained image data and effect quantitative analysis using a computer. Use of a stimulable phosphor in these processes is therefore advantageous.

On the other hand, a fluorescence detecting system using a fluorescent substance as a labeling substance instead of a radioactively labeled substance in the autoradiography system is known. According to this system, it is possible to study a genetic sequence, the expression level of a gene and the metabolism, absorption, excretion path and state of a substance introduced into a test mouse and to effect the separation or identification of protein or the estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed or distributing a plurality of DNA fragments on a gel support containing fluorescent dye or dipping a gel support on which a plurality of DNA fragments have been distributed by means of electrophoresis in a solution containing fluorescent dye, thereby labeling the electrophoresis-distributed DNA fragments, exciting the fluorescent dye by a stimulating ray to cause it to release a fluorescent light, detecting the released fluorescent light to produce an image and detecting the distribution of the DNA on the gel support. This system also performs a process including the steps of distributing a plurality of DNA fragments on a gel support by means of electrophoresis, denaturing the DNA, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release a fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substrate, transforming the fluorescent substrate to a fluorescent substance having a property to release fluorescent light, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

Therefore, there has been proposed an image reading apparatus which can be used in a fluorescence detecting system and is provided with an argon laser stimulating ray source for emitting a laser beam having a wavelength of 488 nm.

However, the radiation diagnosis system, the autoradiographic system, the electron microscope detecting system and the radiation diffraction image detecting system using a stimulable phosphor as the image detecting material and the fluorescence detecting system all scan an image carrier such as a stimulable phosphor sheet, a gel support, a transfer support or the like with a stimulating ray and produce an image by detecting light emitted from the image carrier to effect diagnosis or detection. It is therefore advantageous and preferable to constitute an image reading apparatus so as to be usable for any of these systems.

In view of the above, an image reading apparatus has been proposed, which is provided with a solid laser stimulating ray source for emitting a laser beam having a wavelength of 635 nm capable of exciting a stimulable phosphor BaFX (X representing a halogen.) for making it usable in the autoradiography systems and an LED for emitting light having a wavelength of 450 nm capable of exciting fluorescent substances used in a fluorescence detecting system for making it usable in the fluorescence detecting system.

In this kind of the image reading apparatus, it is normal to direct a stimulating ray emitted from a light source onto a stimulable phosphor layer of a stimulable phosphor sheet using a polygon mirror and scan the surface of the stimulable phosphor layer with the stimulating ray by rotating the polygon mirror and in the case of scanning a stimulating ray in a main scanning direction using a polygon mirror in this manner, the image reading apparatus is provided with a scan starting point sensor for detecting a scan starting point in the main scanning direction in order to compensate for irregularity in rotation of the polygon mirror.

However, in the case of stimulating a specimen labeled with a fluorescent substance and contained in a transfer support consisting of a membrane, since the intensity of emitted fluorescent light is much higher than that in the case of stimulating a stimulable phosphor or a specimen labeled with a fluorescent substance and contained in a gel support, it is necessary to use a laser beam having lower power for stimulation. Therefore, if the sensitivity of the scan starting point sensor is set low so as to be able to detect a scan starting point of a laser beam for stimulating a stimulable phosphor or a specimen labeled with a fluorescent substance and contained in a gel support, it is difficult to accurately detect the scan starting point of a laser beam having lower power for stimulating a specimen labeled with a fluorescent substance and contained in a transfer support. On the other hand, if the sensitivity of the scan starting point sensor is determined to be high so as to be able to detect a scan starting point of a laser beam for stimulating a fluorescent substance contained in the transfer support, when a stimulable phosphor or a specimen labeled with a fluorescent substance and contained in a gel support is stimulated, the scan starting point sensor detects even stray light and it is therefore difficult to accurately detect the scan starting point of a laser beam.

SUMMARY OF THE INVENTION

It is therefore an object of the present invention to provide an image reading apparatus which can be used for a radiation diagnosis system, an autoradiographic system, an electron microscope detecting system and a radiation diffraction image detecting system using a stimulable phosphor and a fluorescence detecting system and can accurately detect a scan starting point in a main scanning direction of a laser beam to read an image.

The above and other objects of the present invention can be accomplished by an image reading apparatus comprising at least one laser stimulating ray source for emitting a laser beam, a laser beam scanning means for scanning the laser beam, a light detection means for photoelectrically detecting light released from an image carrier carrying an image, a scan starting point detecting means for detecting the laser beam and detecting a scan starting point in a main scanning direction, a laser power adjusting means for adjusting power of the laser beam to be projected onto the image carrier in accordance with the kind of the image carrier and a gain switching means for switching gain of the scan starting point detecting means in accordance with the kind of the laser beam and the kind of the image carrier.

In a preferred aspect of the present invention, the laser power adjusting means is constituted so as to adjust the power of the laser beam by positioning an ND filter in an optical path of the laser beam and retracting it from the optical path of the laser beam.

In another preferred aspect of the present invention, the at least one laser stimulating ray source is constituted as a semiconductor laser source and the laser power adjusting means is constituted so as to adjust the power of the laser beam by controlling electrical current supplied to the semiconductor laser source.

In a further preferred aspect of the present invention, a light modulator is further provided and the laser power adjusting means is constituted so as to adjust the power of the laser beam by controlling voltage applied to the light modulator.

In a further preferred aspect of the present invention, the at least one laser stimulating ray source includes a first laser stimulating ray source for emitting a laser beam having a wavelength of 633 nm or 635 nm and a second laser stimulating ray source for emitting a laser beam having a wavelength of 470 nm to 480 nm and the image carrier to be scanned with the laser beam emitted from the first laser stimulating ray source is constituted by a carrier carrying an image of fluorescent substances or a stimulable phosphor sheet containing a stimulable phosphor recording an image selected from the group consisting of a radiation image, an autoradiographic image, a radiographic diffraction image and an electron microscope image of an object and the image carrier to be scanned with the laser beam emitted from the second laser stimulating ray source is constituted by a carrier carrying an image of fluorescent substances.

In a further preferred aspect of the present invention, the at least one laser stimulating ray source further includes a third laser stimulating ray source for emitting a laser beam having a wavelength of 530 to 540 nm and the image carrier to be scanned with the laser beam emitted from the third laser stimulating ray source is constituted by a carrier carrying an image of fluorescent substances.

As termed with respect to the present invention, the phrase "the image carrier carries an image of fluorescent substances" includes the case where the image carrier carries an image of a specimen labeled by a labeling substance and the case where the image carrier carries an image of fluorescent substances obtained by combining an enzyme with a specimen labeled by a labeling substance, causing the enzyme to contact a fluorescent substrate and transforming the fluorescent substrate to a fluorescent substance.

In the present invention, the fluorescent substance employed for labeling a specimen to form an image to be carried in an image carrier and read by stimulating it using a laser beam having a wavelength of from 470 nm to 480 nm may be of any type insofar as it can be stimulated by a laser beam having a wavelength of from 470 nm to 480 nm. However, preferably employed fluorescent substances stimulable by a laser beam having a wavelength of from 470 nm to 480 nm include Fluorescein (C.I. No. 45350), Fluorescein-X indicated by the structural formula (1) shown below, YOYO-1 indicated by the structural formula (2), TOTO-1 indicated by the structural formula (3), YO-PRO-1 indicated by the structural formula (4), Cy-3 (registered trademark) indicated by the structural formula (5), Nile Red indicated by the structural formula (6), BCECF indicated by the structural formula (7), Rhodamine 6G (C.I. No. 45160), Acridine Orange (C.I. No. 46005), SYBR Green ($C_2H_6OS$), Quantum Red, R-Phycoerrythrin, Red 613, Red 670, Fluor X, FAM, AttoPhos, Bodipy phosphatidylcholine, SNAFL, Calcium Green, Fura Red, Fluo 3, AllPro, NBD phosphoethanolamine and the like. In the present invention, the fluorescent substance employed for labeling a specimen to form an image to be carried in an image carrier and read by stimulating it using a laser beam having a wavelength of from 633 nm or 635 nm may be of any type insofar as it can be stimulated by a laser beam having a wavelength of from 633 nm or 635 nm. However, preferably employed fluorescent substances stimulable by a laser beam having a wavelength of from 633 nm or 635 nm include Cy-5 (registered trademark) indicated by the structural formula (8), Allphycocyanin and the like. Moreover, in the present invention, the fluorescent substance employed for labeling a specimen to form an image to be carried in an image carrier and read by stimulating it using a laser beam having a wavelength of from 530 nm to 540 nm may be of any type insofar as it can be stimulated by a laser beam having a wavelength of from 530 nm to 540 nm. However, preferably employed fluorescent substances stimulable by a laser beam having a wavelength of from 530 nm to 540 nm include Cy-3 (registered trademark) indicated by the structural formula (5), Rhodamine 6G (C.I. No. 45160), Rhodamine B (C.I. No. 45170), Ethidium Bromide indicated by the structural formula (9), Texas Red indicated by the structural formula (10), Propidium Iodide indicated by the structural formula (11), POPO-3 indicated by the structural formula (12), Red 613, Red 670, Carboxyrhodamine (R6G), R-Phycoerythirin, Quantum Red, JOE, HEX, Ethidium homodimer, Lissamine rhodamine B peptide and the like.

FORMULA (1)

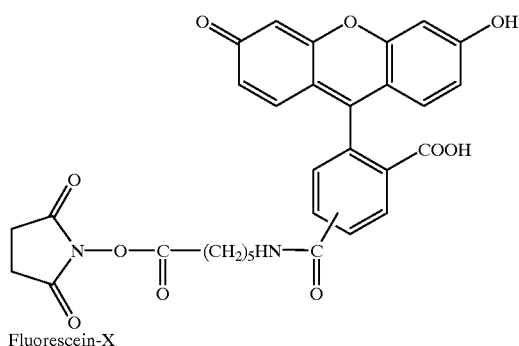

Fluorescein-X

FORMULA (2)

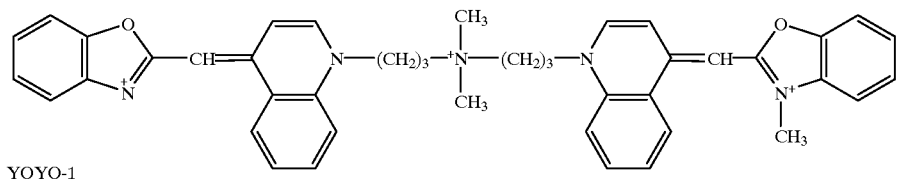

YOYO-1

FORMULA (3)

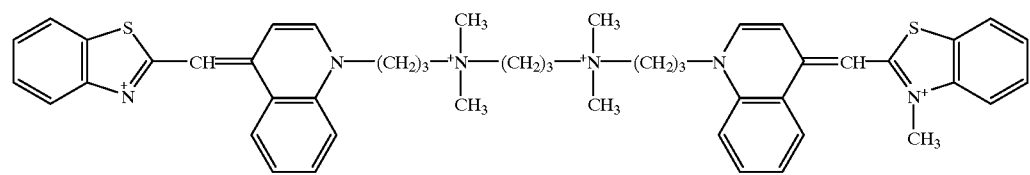

TOTO-1

FORMULA (4)

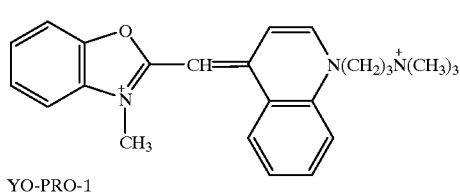

YO-PRO-1

-continued
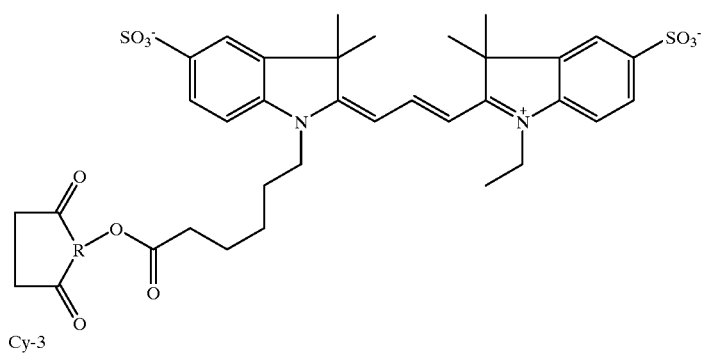
Cy-3
FORMULA (5)
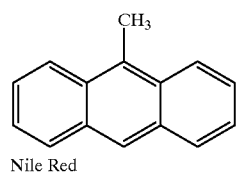
Nile Red
FORMULA (6)
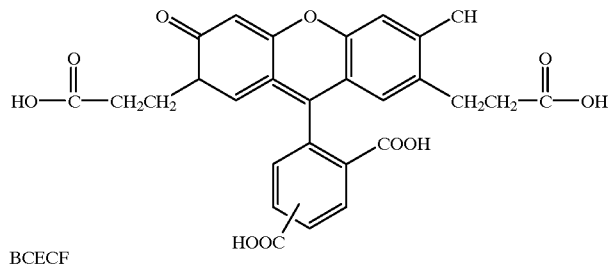
BCECF
FORMULA (7)
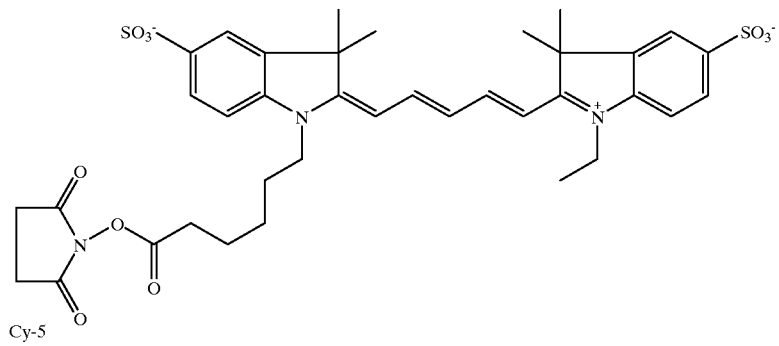
Cy-5
FORMULA (8)
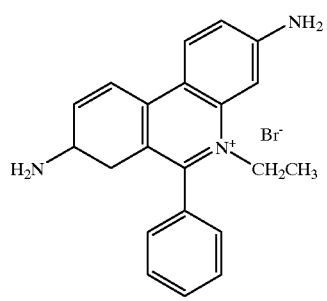
Ethidium Bromide
FORMULA (9)

FORMULA (11)

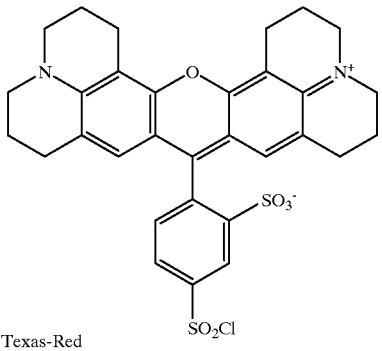

Texas-Red

FORMULA (10)

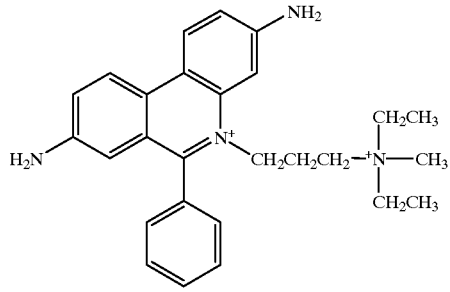

Propidium Iodide

FORMULA (12)

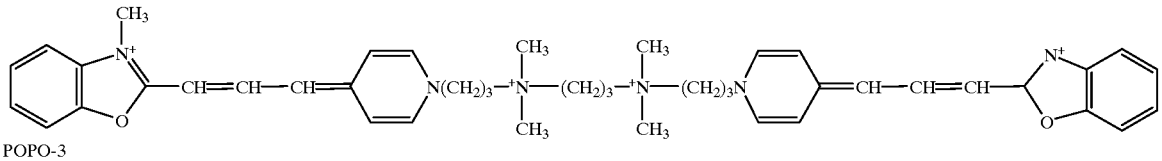

POPO-3

In the present invention, the stimulable phosphor employed for producing a radiation image, an autoradiographic image, a radiographic diffraction image and an electron microscopic image of an object may be of any type insofar as it can store radiation energy or electron beam energy and can be stimulated by an electromagnetic wave to release the radiation energy or electron beam energy stored therein in the form of light. However, a stimulable phosphor which can be stimulated by light having a visible light wavelength is preferably employed. More specifically, preferably employed stimulable phosphors include alkaline earth metal fluorohalide phosphors $(Ba_{1-x}, M^{2+}_x)F\ X:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce) disclosed in Japanese Patent Application Laid Open No. 2-276997, europium activated complex halide phosphors $BaFX\ xNaX':aEu^{2+}$ (where each of X and X' is at least one halogen selected from the group consisting of Cl, Br and I; x is greater than 0 and equal to or less than 2; and y is greater than 0 and equal to or less than 0.2) disclosed in Japanese Patent Application Laid Open No. 59-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1) disclosed in U.S. Pat. No. 4,539,137 and europium activated complex halide phosphors $M''FX\ aM'X'\ bM'''X''_2\ cM'''X'''_3\ xA:yEu^{2+}$ (where M'' is at least one alkaline earth metal selected from the group consisting of Be, Sr and Ca; M' is at least one alkaline metal selected from the group consisting of Li, Na, K, Rb and Cs; M''' is at least one divalent metal selected from the group consisting of Be and Mg; M'''' is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a is equal to or greater than 0 and equal to or less than 2; b is equal to or greater than 0 and equal to or less than $10^{-2}$; c is equal to or greater than 0 and equal to or less than $10^{-2}$; a+b+c is equal to or greater than $10^{-2}$; x is greater than 0 and equal to or less than 0.5; and y is greater than 0 and equal to or less than 0.2) disclosed in U.S. Pat. No. 4,962,047.

The above and other objects and features of the present invention will become apparent from the following description made with reference to the accompanying drawings.

DESCRIPTION OF THE PREFERRED EMBODIMENTS

Figure 1:
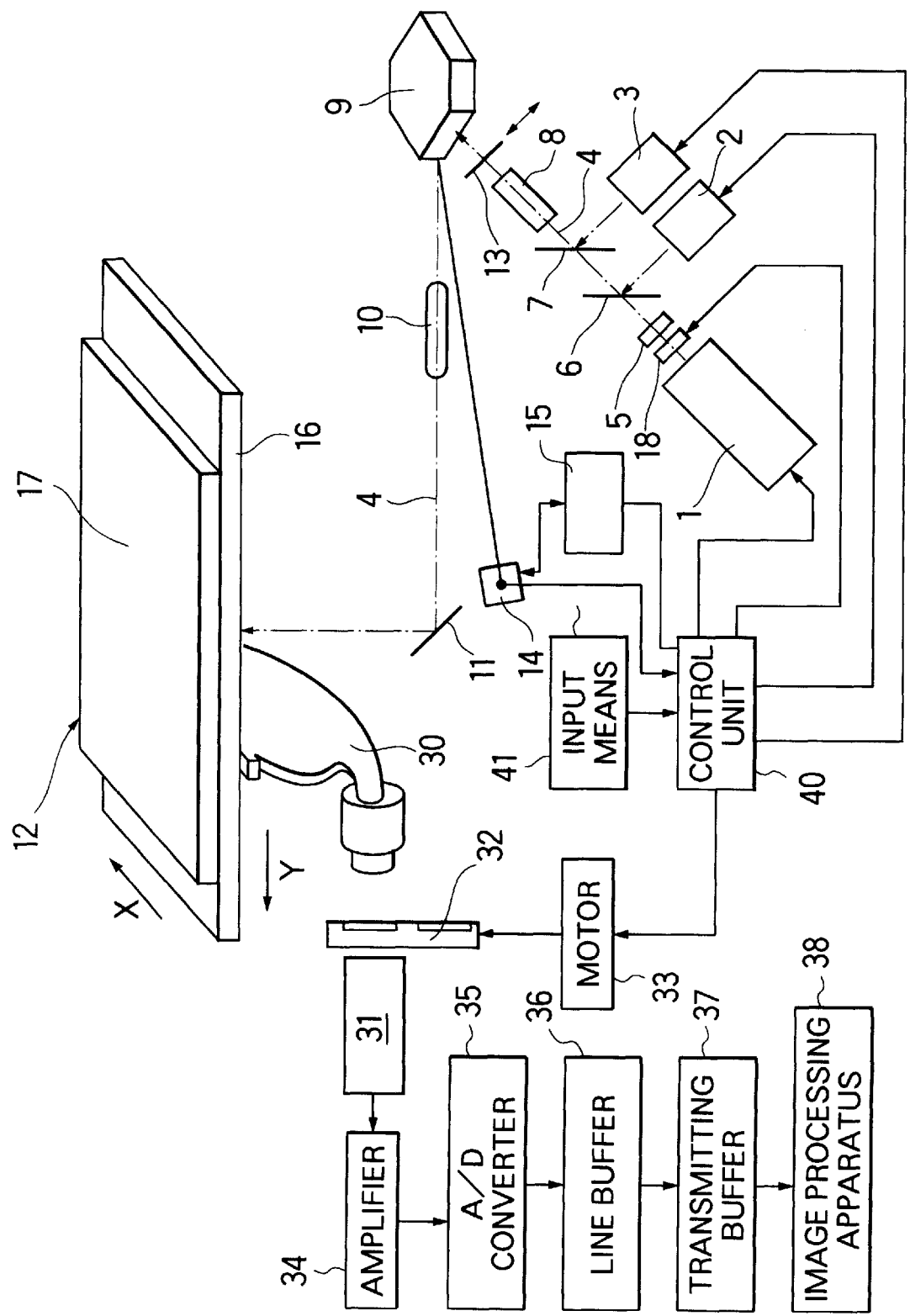
FIG. 1 is a schematic perspective view showing an image reading apparatus which is a preferred embodiment of the present invention.

As shown in FIG. 1, an image reading apparatus includes a first laser stimulating ray source 1 for emitting a laser beam having a wavelength of 633 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 is constituted by a He-Ne laser beam source and the second laser stimulating ray source 2 and the third laser stimulating ray source 3 are constituted by a second harmonic generation element.

When a light modulator 18 is turned on, a laser beam 4 emitted from the first laser stimulating ray source 1 passes through the light modulator 18 and then a filter 5, thereby cutting light in a wavelength region corresponding to a wavelength region of stimulated emission emitted from the stimulable phosphor sheet in response to stimulation by the laser beam 4 having a wavelength of 633 nm. A first dichroic mirror 6 for transmitting light having a wavelength of 633 nm but reflecting light having a wavelength of 532 nm and a second dichroic mirror 7 for transmitting light having a wavelength longer than 532 nm but reflecting light having a wavelength of 473 nm are provided in the optical path of the laser beam 4 emitted from the first laser stimulating ray source 1. The laser beam 4 emitted from the first laser stimulating source 1 and transmitted through the filter 5 passes through the first dichroic mirror 6 and the second dichroic mirror 7. The laser beam 4 emitted from the second laser stimulating ray source 2 is reflected by the first dichroic mirror 6, thereby changing the direction thereof by 90 degrees, and passes through the second dichroic mirror 7. The laser beam 4 emitted from the third laser stimulating ray source 3 is reflected by dichroic mirror 7, thereby changing the direction thereof by 90 degrees. The laser beam 4 emitted from the selected one of the first laser stimulating source 1, the second laser stimulating ray source 2 and the third laser stimulating ray source 3 then impinges on the beam expander 8. The beam diameter of the laser beam 4 is accurately adjusted by the beam expander 8 and the laser beam 4 enters a polygon mirror 9. The laser beam 4 deflected by the polygon mirror 9 passes through an fθ lens 10 and is reflected by a reflecting mirror 11, thereby impinging upon a sheet-like image carrier unit 12. The fθ lens 10 ensures that the image carrier unit 12 is always scanned with the laser beam 4 at a uniform beam speed when it is scanned with the laser beam 4 in a direction indicated by X, namely, the main scanning direction. In FIG. 1, the reference numeral 13 designates an ND filter which is movable so as to be located in the optical path of the laser beam 4 and retracted from the optical path of the laser beam 4. Further, in FIG. 1, the reference numeral 14 designates a scan starting point sensor for detecting a scan starting point in the main scanning direction of the laser beam 4 and in this embodiment, the gain of the scan starting point sensor 14 can be switched by a gain switching means 15.

The image reading apparatus according to this embodiment is constituted so as to be able to read out an image of fluorescent dye recorded in a gel support, a transfer support or the like, and a radiation image, an autoradiographic image, a radiographic diffraction image or an electron microscopic image of an object recorded in a stimulable phosphor layer formed on a stimulable phosphor sheet. In FIG. 1, the image carrier unit 12 includes a glass plate 16 and a transfer support 17 consisting of a membrane placed on the glass plate 11 and in which an electrophoresis image of denatured DNA labeled with fluorescent dye is recorded.

The electrophoresis image of denatured DNA labeled with fluorescent dye is recorded in the transfer support 17 consisting of the membrane, for example, in the following manner. First, a plurality of DNA fragments containing a specific gene are separated and distributed on a gel support medium by means of electrophoresis and are denatured by alkali processing to form single-stranded DNA. Then, according to the known Southern blotting method, the gel support and a transfer support 17 are stacked to transfer at least a part of the denatured DNA fragments onto the transfer support 17 and the transferred DNA fragments are fixed on the transfer support 17 by heating and irradiating with an ultraviolet ray. Further, probes prepared by labeling DNA or RNA with fluorescent dye, which is complementary to the DNA containing the specific gene, and the denatured DNA fragments on the transfer support 17 are hybridized by heating to form double-stranded DNA fragments or combined DNA and RNA. In this embodiment, since it is intended to detect three kinds of target DNA, three kinds of fluorescent dyes releasing different fluorescent light, for example, Fluorescein, Rhodamine and Cy-5, are used and DNA or RNA which is complementary to the DNA containing DNA of the specific gene is labeled therewith to prepare the probes. Since the denatured DNA fragments are fixed on the transfer support 17 at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support 17 to be fluorescently labeled. The thus obtained transfer support 17 records an electrophoresis image of the denatured DNA labeled with fluorescent dye.

Figure 2:
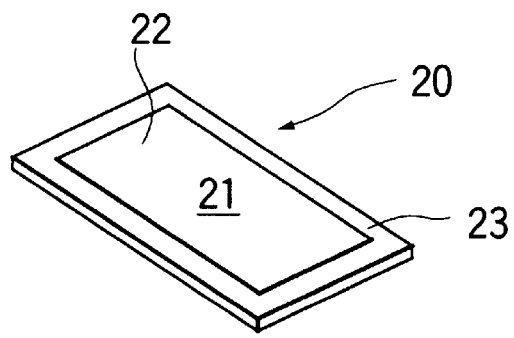
FIG. 2 is a schematic perspective view showing a stimulable phosphor sheet unit.

FIG. 2 is a schematic perspective view showing a stimulable phosphor sheet unit 20.

When a radiation image or electron beam image recorded in a stimulable phosphor layer formed on the stimulable phosphor sheet is to be read, the stimulable phosphor sheet unit 20 is set instead of the image carrier unit 12. As shown in FIG. 2, the stimulable phosphor sheet unit 20 includes a stimulable phosphor sheet 22 formed with a stimulable phosphor layer 21 on one surface thereof and a magnetic layer (not shown) on the other surface thereof and a support plate 23 such as an aluminum plate onto which a gum-like magnetic sheet (not shown) is adhered on one surface thereof. The magnetic layer of the stimulable phosphor sheet 22 and the magnet sheet of the support plate 23 are adhered by magnetic force and integrated. In this embodiment, the stimulable phosphor layer 21 formed on the stimulable phosphor sheet 22 records, for example, locational information regarding a radioactively labeled substance contained in a gene produced by the Southern blot hybridization method. Locational information as termed here includes a variety of information relating to the location of radioactive labeled substances, or aggregations thereof, present in a specimen, such as the location, the shape, the concentration, the distribution or combinations thereof.

The locational information regarding a radioactively labeled substance is stored in the stimulable phosphor layer 21 of the stimulable phosphor sheet 15, for example, in the following manner. First, a plurality of DNA fragments containing a specific gene are separated and distributed on a gel support medium by means of electrophoresis and are denatured by alkali processing to form single-stranded DNA. Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating. Further, probes prepared by radioactively labeling DNA or RNA which is complementary to the DNA containing the specific gene and the denatured DNA fragments are hybridized by heating to form double-stranded DNA fragments or combined DNA and RNA. Since the denatured DNA fragments are fixed on the transfer support at this time, only the DNA fragments which are complimentary to the probe DNA or probe RNA are hybridized to acquire the radioactively labeled probe. Then, the probes which have not formed hybrids are removed by washing with a proper solution and only the DNA fragments having a specific gene form hybrids with the radioactively labeled DNA or RNA on the transfer support to be radioactively labeled. The thus obtained transfer support and the stimulable phosphor layer 21 of the stimulable phosphor sheet 22 are stacked for a certain period of time to expose the stimulable phosphor layer 21 and at least a part of the radiation emitted from the radioactively labeled substance on the transfer support is absorbed in the stimulable phosphor layer 21 formed on the stimulable phosphor sheet 22, whereby the locational information regarding the radioactively labeled substance in the specimen is stored in the form of an image in the stimulable phosphor layer 21.

Figure 3:
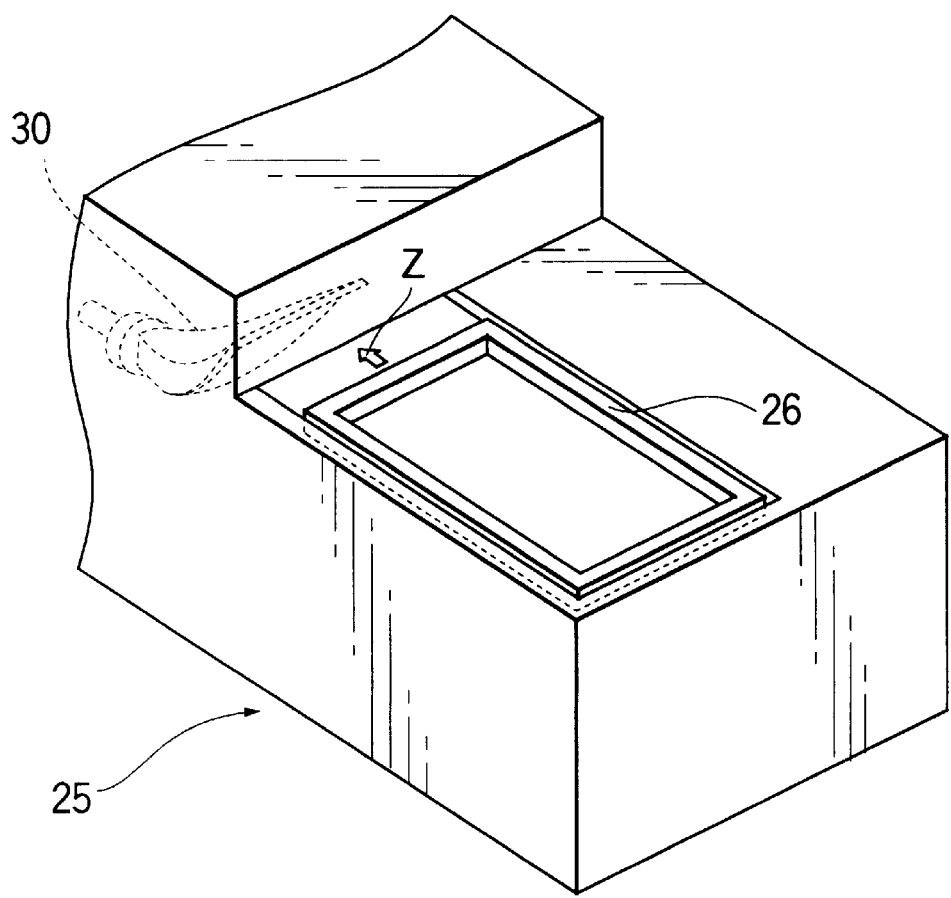
FIG. 3 a schematic perspective view showing the exterior of an image reading apparatus which is an embodiment of the present invention.

FIG. 3 is a schematic perspective view showing the exterior of an image reading apparatus which is an embodiment of the present invention.

As shown in FIG. 3, the image reading apparatus 25 includes a sample stage 26 on which the image carrier unit 12 or the stimulable phosphor sheet unit 20 is set. The image carrier unit 12 or the stimulable phosphor sheet unit 20 set on the sample stage 26 is conveyed by a conveyance mechanism (not shown) in the direction indicated by Z in FIG. 3 and is located at a predetermined position in the image reading apparatus 25 to be scanned with the laser beam 4.

The image carrier unit 12 or the stimulable phosphor sheet unit 20 is conveyed by a motor (not shown) in the direction of the arrow Y, namely, the sub-scanning direction in FIG. 1 in synchronism with the scanning with the laser beam 4 in the main scanning direction so that the whole surface of the transfer support 17 or the stimulable phosphor layer 21 of the stimulable phosphor sheet 22 is scanned by the laser beam 4.

Fluorescent light emitted from fluorescent dye contained in the transfer support 17 by stimulating the fluorescent dye or stimulated emission emitted from stimulable phosphor contained in the stimulable phosphor layer 21 formed on the stimulable phosphor sheet 22 by stimulating the stimulable phosphor upon being irradiated with the laser beam 4 enters a light guide 30 positioned in the vicinity of the transfer support 17 or the stimulable phosphor sheet 22 so as to face the scanning line on the transfer support 17 or the stimulable phosphor sheet 22.

The light receiving end of the light guide 30 has a linear shape and the exit end thereof is disposed close to the light receiving surface of a light detector 31 such as a photomultiplier for photoelectrically detecting light. This light guide 30 is made by processing a non-fluorescent glass or the like and so constituted that the emission introduced from the light receiving end is transmitted to the exit end under repeated total reflection within the light guide 30 and received by the light receiving surface of the light detector 31 via the exit end.

Therefore, the fluorescent light emitted from the fluorescent dye contained in the transfer support 17 or the stimulated emission produced by the stimulable phosphor layer 21 of the stimulable phosphor sheet 22 upon being irradiated with the laser beam 4 enters the light guide 30 and is received by the light detector 31 via the exit end under repeated total reflection within the light guide 30.

Figure 4:
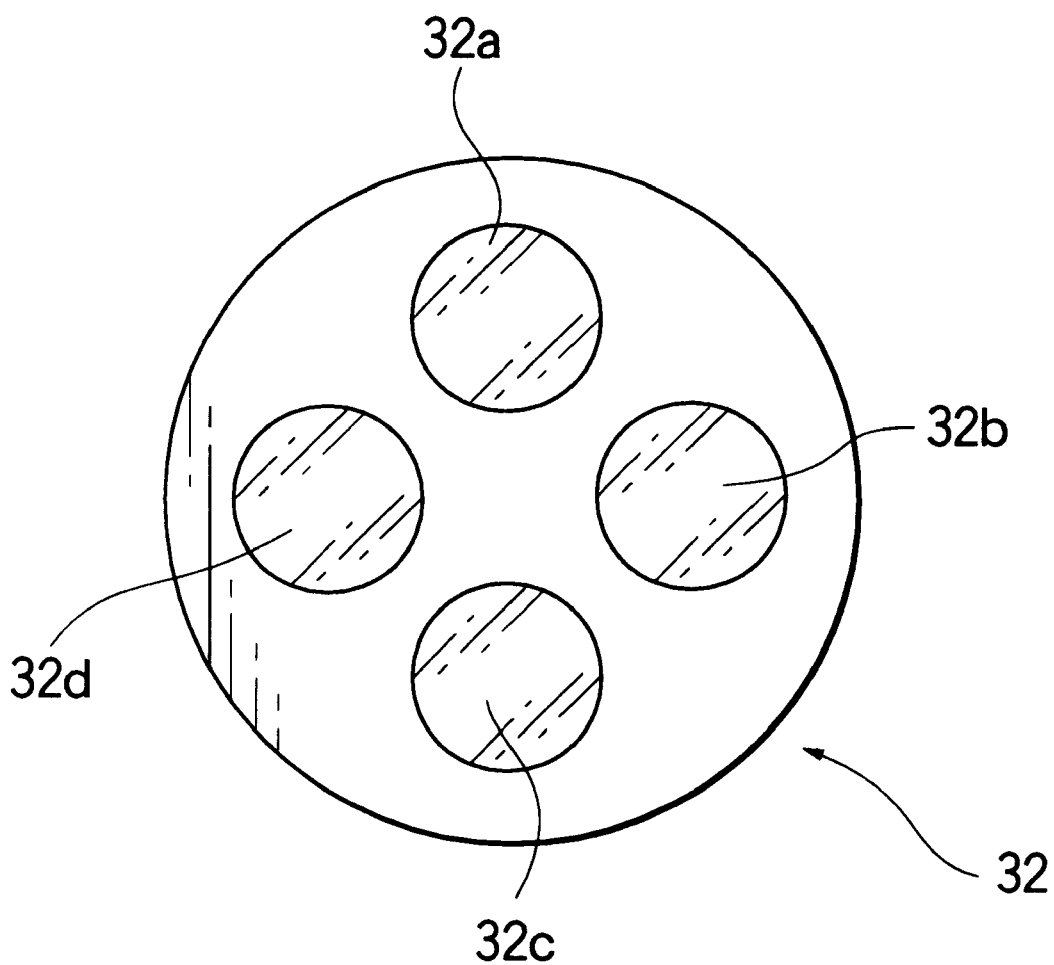
FIG. 4 is schematic view showing a filter member.

In front of the light receiving surface of the light detector 31 is provided a filter member 32. FIG. 4 is a schematic front view of the filter member 32. The filter member 32 is constituted by a rotatable disk provided with four filters 32a, 32b, 32c and 32d. The filter 32a is used for reading fluorescent light released from fluorescent dye contained in the transfer support 17 upon being excited using the first laser stimulating ray source 1 and has a property to cut off light having a wavelength of 633 nm but transmit light having a wavelength longer than 633 nm. The filter 32b is used for reading fluorescent light released from fluorescent dye contained in the transfer support 17 upon being excited using the second laser stimulating ray source 2 and has a property to cut off light having a wavelength of 532 nm but transmit light having a wavelength longer than 532 nm. The filter 32c is used for reading fluorescent light released from fluorescent dye contained in the transfer support 17 upon being excited using the third laser stimulating ray source 3 and has a property to cut off light having a wavelength of 473 nm but transmit light having a wavelength longer than 473 nm. The filter 32d is used for reading stimulated emission released from the stimulable phosphor sheet 22 when the stimulable phosphor contained in the stimulable phosphor layer 21 formed on the stimulable phosphor sheet 22 is excited using the first laser stimulating ray source 1 and has a property to allow only light of the wavelength region of the stimulated emission released from the stimulable phosphor to pass through and cuts off light having a wavelength of 633 nm. Therefore, in accordance with the laser stimulating ray source to be employed, namely, the kind of fluorescent dye and the kind of the image carrier, in other words, whether the image carrier is a stimulable phosphor sheet 22 or not, the light detector 31 can photoelectrically detect only light to be detected by selectively employing the filters 32a, 32b, 32c and 32d. The filter member 32 can be rotated by a motor 33. A photomultiplier containing a bialkali material based on the compound $K_2CsSb$ prepared by activation with oxygen and cesium is used as the light detector 31.

The light photoelectrically detected by the light detector 31 is converted to an electrical signal, amplified by an amplifier 34 having a predetermined amplifying factor so as to produce an electrical signal of a predetermined level and then input to an A/D converter 35. The electrical signal is converted in the A/D converter 35 to a digital signal with a scale factor suitable for the signal fluctuation width and input to a line buffer 36. The line buffer 36 temporarily stores image data corresponding to one scanning line. When the image data corresponding to one scanning line have been stored in the line buffer 36 in the above described manner, the line buffer 36 outputs the data to a transmitting buffer 37 whose capacity is greater than that of the line buffer 36 and when the transmitting buffer 37 has stored a predetermined amount of the image data, it outputs the image data to an image processing apparatus 38. The image data input to the image processing apparatus 38 are stored in an image data storing means (not shown). The image data are read out from the image data storing means, image-processed as occasion demands and displayed on display means such as a CRT (not shown) as a visual image or analyzed by an image analyzing apparatus (not shown).

The image reading apparatus further includes the control unit 40 and input means 41 including a keyboard, and the laser stimulating ray source 1, 2 or 3 to be used and the filter 32a, 32b or 32c to be selected in accordance with the kind of fluorescent substance have been determined in advance and stored in a memory (not shown) of the control unit 40. The memory further stores information indicating that the first laser stimulating ray source 1 for emitting a laser beam having a wavelength of 633 nm and the filter 32d should be selected and used when an image recorded in the stimulable phosphor layer 21 formed on the stimulable phosphor sheet 22 is to be read out. Moreover, the memory of the control unit 40 stores set values of gain of the scan starting point sensor 14 which have been determined in advance in accordance with the kind of image carrier, namely, whether the image carrier is an image carrier carrying an image of a fluorescent substance or a stimulable phosphor sheet, and whether an image carrier carrying an image of a fluorescent substance is a transfer support consisting of a membrane or a gel support. In the case where a stimulable phosphor sheet or a gel support carrying an image of a fluorescent substance is stimulated with a laser beam emitted from the first laser stimulating ray source 1, since the power of the laser beam 4 is high, the gain of the scan starting point sensor 14 is set to a low value G1L. In the case where an image carrier is a transfer support 17 consisting of a membrane carrying an image of a fluorescent substance, since the intensity of fluorescent light emitted from a fluorescent substance is great, the laser beam 4 emitted from the first laser stimulating ray source 1 is caused to pass through an ND filter, thereby lowering the power thereof, as described later. Therefore, the gain of the scan starting point sensor 14 is set to a high value G1H. Similarly, in the case where a fluorescent substance contained in a gel support is stimulated with a laser beam 4 emitted from the second laser stimulating ray source 2, the gain of the scan starting point sensor 14 is set to a low value G2L and in the case where a fluorescent substance contained in a transfer support 17 is stimulated with a laser beam 4 emitted from the second laser stimulating ray source 2, the gain of the scan starting point sensor 14 is set to a high value G2H. Further, in the case where a fluorescent substance contained in a gel support is stimulated with a laser beam 4 emitted from the third laser stimulating ray source 3, the gain of the scan starting point sensor 14 is set to a low value G3L and in the case where a fluorescent substance contained in a transfer support 17 is stimulated with a laser beam 4 emitted from the third laser stimulating ray source 3, the gain of the scan starting point sensor 14 is set to a high value G3H.

Figure 5:
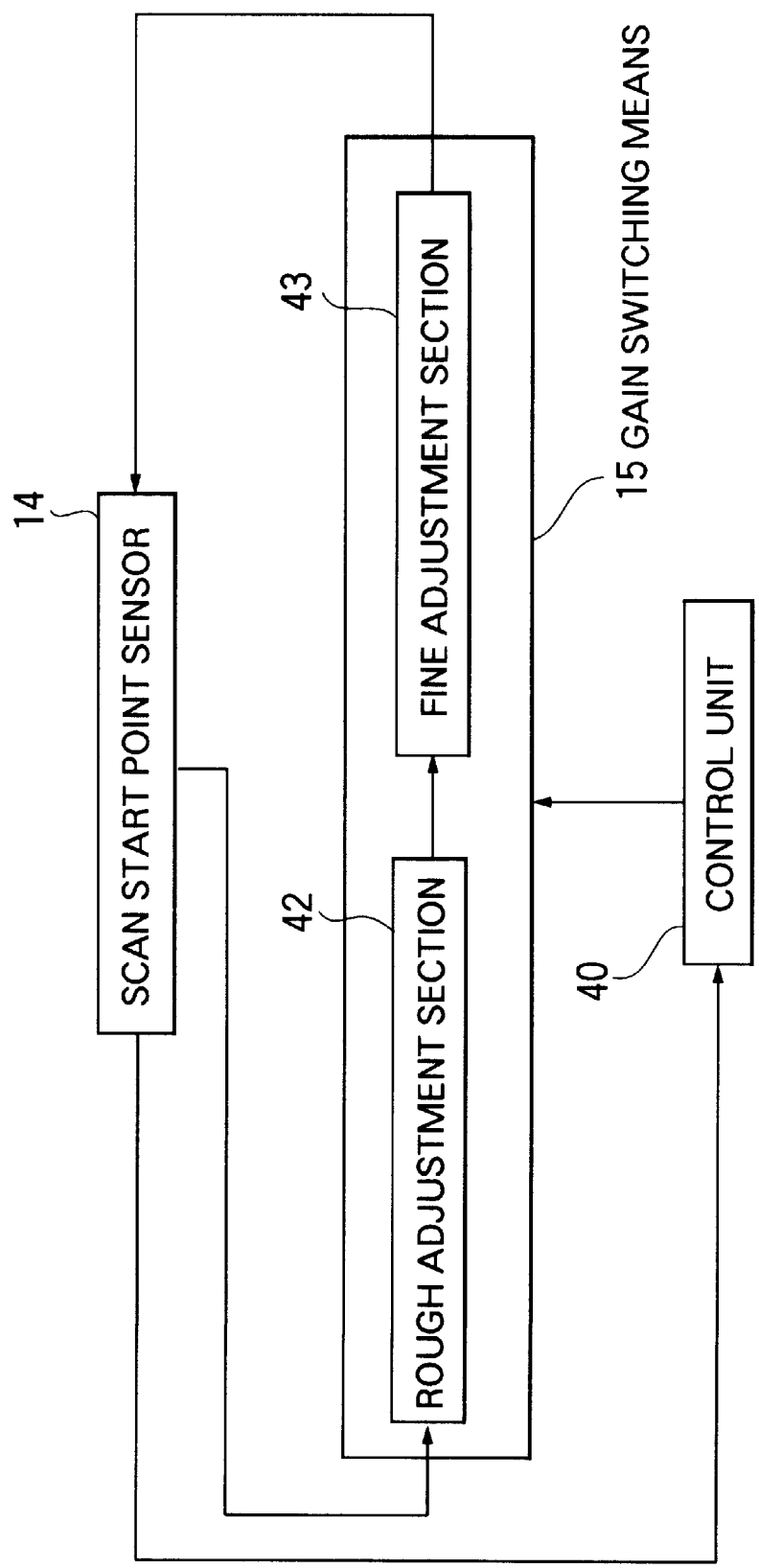
FIG. 5 is a bloc diagram of a gain switching means.

FIG. 5 is a block diagram of the gain switching means 15. As shown in FIG. 5, the gain switching means 15 includes a rough adjustment section 42 for roughly adjusting the gain of the scan starting point sensor 14 and a fine adjustment section 43 for finely adjusting the gain of the scan starting point sensor 14. Therefore, the gain of the scan starting point sensor 14 can be quickly switched to a predetermined value.

In view of the above, when an image of fluorescent dye contained in the transfer support 17 is read out, the operator inputs through the input means 41 an instruction that the image carrier is the transfer support 17 and the kind of fluorescent substance contained in the transfer support 17 and when a radiation image recorded in the stimulable phosphor layer 21 formed on the stimulable phosphor sheet 22 is read out, the operator inputs through the input means 41 an instruction that the image carrier is the stimulable phosphor sheet 22. As a result, the control unit 40 automatically selects one of the first laser stimulating ray source 1, the second laser stimulating ray source 2 and the third laser stimulating ray source 3 and one of the filters 32a, 32b, 32c and 32d. More specifically, when the kind of fluorescent dye is input through the input means 41, the control unit 40 drives the motor 33 and rotates the filter member 32 in accordance with the kind of fluorescent dye contained in the transfer support 17 so as to position one of the filters 32a, 32b, 32c and 32d in front of the light detector 31 and at the same time, it selectively activates one of the first laser stimulating ray source 1, the second laser stimulating ray source 2 and the third laser stimulating ray source 3 to emit the laser beam 4. On the other hand, when an instruction that the image carrier is a stimulable phosphor sheet is input through the input means 41, the control unit 40 drives the motor 33 and rotates the filter member 32 so as to position the filter 32d in front of the light detector 31 and at the same time, it activates the first laser stimulating ray source 1 to emit the laser beam 4. The control unit 40 simultaneously outputs a gain switching signal in accordance with an input signal to the gain switching means 15 to cause it to switch the gain of the scan starting point sensor 14 to the set value stored in the memory and when the image carrier is the transfer support 17, it outputs a signal to a drive means (not shown) so as to position the ND filter 13 in the optical path of the laser beam 4. The image reading is then started.

When an electrophoresis image of denatured DNA fragments labeled with fluorescent dye is to be read out, the operator sets the fluorescent image carrier unit 12 on the sample stage of the image reading apparatus 25 and conveys it to the position shown in FIG. 1. At the same time, the operator inputs the kind of fluorescent dye used for labeling a probe through the input means 41. The image reading apparatus according to this embodiment is provided with the first laser stimulating ray source 1 for emitting a laser beam having a wavelength of 633 nm, the second laser stimulating ray source 2 for emitting a laser beam having a wavelength of 532 nm and the third laser stimulating ray source 3 for emitting a laser beam having a wavelength of 473 nm and in this embodiment, DNA fragments of the target gene are labeled with three kinds of fluorescent dye, namely, Fluorescein, Rhodamine B and Cy-5. The wavelength of a laser beam which can most efficiently excite Fluorescein is 490 nm, the wavelength of a laser beam which can most efficiently excite Rhodamine B is 534 nm and the wavelength of a laser beam which can most efficiently excite Cy-5 is 650 nm. Therefore, it is efficient to scan the transfer support 17 using the third laser stimulating ray source 3 for detecting the DNA fragments labeled with Fluorescein, to scan the transfer support 17 using the second laser stimulating ray source 2 for detecting the DNA fragments labeled with Rhodamine B and to scan the transfer support 17 using the first laser stimulating ray source 1 for detecting the DNA fragments labeled with Cy-5.

Accordingly, in this embodiment, the image reading apparatus is constituted so that the operator can input the kinds of fluorescent dye forming fluorescent images to be read and the order of the fluorescent images to be read. When an instruction signal requesting to read first a fluorescent image of the DNA fragments labeled with Cy-5, then read a fluorescent image of the DNA fragments labeled with Rhodamine B and finally read a fluorescent image of the DNA fragments labeled with Fluorescein is input through the input means 41 by the operator, the control unit 40 outputs a drive signal to the motor 33 to rotate the filter member 32 so that the filter 32a is positioned in front of the light detector 31, activates the first laser stimulating ray source 1 and turns on the light modulator 18. As a result, a laser beam 4 having a wavelength of 633 nm is emitted from the first laser stimulating ray source 1 and the laser beam 4 passes through the light modulator 18. The laser beam 4 further passes through the dichroic mirrors 6, 7 and the beam diameter thereof is accurately adjusted by the beam expander 8. The laser beam 4 then passes through the ND filter 13, whereby the power thereof is lowered to about 1/100 and impinges on the polygon mirror 9. The power of the laser beam 4 is lowered by the ND filter 13 because the intensity of fluorescent light emitted from the transfer support 17 consisting of a membrane is greater than that of fluorescent light emitted from a gel support. The laser beam 4 deflected by the polygon mirror 9 impinges on the scan starting point sensor 14. Since the gain of the scan starting point sensor 14 is set to a high value G1H, the scan starting point sensor 14 can detects even the laser beam whose intensity has been lowered by the ND filter 13 with high accuracy. When the scan starting point sensor 14 detects the laser beam 4, it outputs a scanning start signal to the control unit 40. When the control unit 40 receives the scanning start signal from the scan starting point sensor 14, it starts producing image data. As the polygon mirror 9 is rotated, the laser beam 4 emitted from the first laser stimulating ray source 1 and deflected by the polygon mirror 9 is reflected by the reflecting mirror 11 via the fθ lens 10 and impinges on the transfer support 17. Since the laser beam 4 is scanned on the surface of the transport support 17 in the main scanning direction indicated by X in FIG. 1, while the image carrier unit 12 is moved in the sub-scanning direction indicated by Y in FIG. 1, the whole surface of the transfer support 17 is scanned with the laser beam 4 having a wavelength of 633 nm. As a result, Cy-5 contained in the transfer support 17 is excited and releases fluorescent light having a peak wavelength of 667 nm.

Fluorescent light released from Cy-5, which is the fluorescent dye contained in the transfer support 17, enters the light guide 30 and impinges on the filter 32a via the exit end of the light guide 30 under repeated total reflection within the light guide 30. Since the filter 32a has a property to cut off light having a wavelength of 633 nm and transmit light having a wavelength longer than 633 nm and the wavelength of the fluorescent light released from Cy-5 is longer than the wavelength of the stimulating ray, only fluorescent light released from Cy-5 is photoelectrically detected by the light detector 31 and is amplified by the amplifier 34 to an electrical signal having a predetermined level. The electrical signal is then converted by the A/D converter 39 to a digital signal with a scale factor suitable for the signal fluctuation width and is stored in the line buffer 36. When the image data corresponding to one scanning line have been stored in the line buffer 36, the line buffer 36 outputs the data to a transmitting buffer 37.

The image data obtained by detecting fluorescent light released from Cy-5 are output from the transmitting buffer 37 to the image processing apparatus 38 and a visual image is displayed on a display means such as a CRT display based thereon. The display image contains an image of the DNA fragments labeled with Cy-5 and the image data produced in the above described manner are stored in an image data storing means (not shown) or are analyzed by an image analyzing apparatus (not shown) as occasion demands.

When the excitation by the first laser stimulating ray source 1 has been completed, the control unit 40 turns off the light modulator 18 to cut the laser beam 4 emitted from the first laser stimulating ray source 1 and outputs a drive signal to a motor (not shown) to return the image carrier unit 12 to its original position. The control unit 40 then outputs a drive signal to the motor 33 to rotate the filter member 32 so that the filter 32b is positioned in front of the light receiving surface of the light detector 31 and activates the second laser stimulating ray source 2. As a result, a laser beam 4 having a wavelength of 532 nm is emitted from the second laser stimulating ray source 2, reflected by the dichroic mirror 6 and passes through the dichroic mirrors 7. After the beam diameter of the laser beam 4 has been accurately adjusted by the beam expander 8, the laser beam 4 passes through the ND filter 13, whereby the power thereof is lowered to 1/100 and impinges on the polygon mirror 9. The laser beam 4 deflected by the polygon mirror 9 impinges on the scan start point sensor 14. Since the gain of the scan start point sensor 14 is set to a high value G2H, the scan start point sensor 14 can detect even the laser beam whose power has been lowered with high accuracy. When the scan start point sensor 14 detects the laser beam 4, it outputs a scanning start signal to the control unit 40. When the control unit receives the scanning start signal from the scan start point sensor 14, it starts producing image data. As the polygon mirror 9 is rotated, the laser beam 4 emitted from the second laser stimulating ray source 2 and deflected by the polygon mirror 9 is reflected by the reflecting mirror 11 via the fθ lens 10 and impinges on the transfer support 17. Since the laser beam 4 is scanned on the transport support 17 in the main scanning direction, while the image carrier unit 12 is moved in the sub-scanning direction, the whole surface of the transfer support 17 is scanned with the laser beam 4 having a wavelength of 532 nm. As a result, Rhodamine B contained in the transfer support 17 is excited and releases fluorescent light having a peak wavelength of 605 nm.

Fluorescent light released from Rhodamine B, which is the fluorescent dye contained in the transfer support 17, enters the light guide 30 and impinges on the filter 32b via the exit end of the light guide 30 under repeated total reflection within the light guide 30. Since the filter 32b has a property to cut off light having a wavelength of 532 nm and transmit light having a wavelength longer than 532 nm and the wavelength of the fluorescent light released from the fluorescent dye is longer than the wavelength of the stimulating ray, only fluorescent light released from Rhodamine B is photoelectrically detected by the light detector 31 and is amplified by the amplifier 34 to an electrical signal having a predetermined level. The electrical signal is then converted by the A/D converter 39 to a digital signal with a scale factor suitable for the signal fluctuation width and is stored in the line buffer 36. When the image data corresponding to one scanning line have been stored in the line buffer 36, the line buffer 36 outputs the data to a transmitting buffer 37.

The image data obtained by detecting fluorescent light released from Rhodamine B are output from the transmitting buffer 37 to the image processing apparatus 38 and a visual image is displayed on the display means such as a CRT display based thereon. The display image contains an image of the DNA fragments labeled with Rhodamine B and the image data produced in the above described manner are stored in an image data storing means (not shown) or are analyzed by an image analyzing apparatus (not shown) as an occasion demands.

When the excitation by the second laser stimulating ray source 2 has been completed, the control unit 40 outputs a drive signal to a motor (not shown) to return the image carrier unit 12 to its original position. The control unit 40 then outputs a drive signal to the motor 33 to rotate the filter member 32 so that the filter 32c is positioned in front of the light receiving surface of the light detector 31 and activates the third laser stimulating ray source 3. As a result, a laser beam 4 having a wavelength of 473 nm is emitted from the third laser stimulating ray source 3 and reflected by the dichroic mirror 7. After the beam diameter of the laser beam 4 has been accurately adjusted by the beam expander 8, the laser beam 4 passes through the ND filter 13, whereby the power thereof is lowered to $\frac{1}{100}$ and impinges on the polygon mirror 9. The laser beam 4 deflected by the polygon mirror 9 impinges on the scan start point sensor 14. Since the gain of the scan start point sensor 14 is set to a high value G3H, the scan start point sensor 14 can detect even the laser beam whose power has been lowered with high accuracy. When the scan start point sensor 14 detects the laser beam 4, it outputs a scanning start signal to the control unit 40. When the control unit receives the scanning start signal from the scan start point sensor 14, it starts producing image data. As the polygon mirror 9 is rotated, the laser beam 4 emitted from the third laser stimulating ray source 3 and deflected by the polygon mirror 9 is reflected by the reflecting mirror 11 via the fθ lens 10 and impinges on the transfer support 17. Since the laser beam 4 is scanned on the transport support 17 in the main scanning direction, while the image carrier unit 12 is moved in the sub-scanning direction, the whole surface of the transfer support 17 is scanned with the laser beam 4 having a wavelength of 473 nm. As a result, Fluorescein contained in the transfer support 17 is excited and releases fluorescent light having a peak wavelength of 530 nm. In this embodiment, since fluorescent dye is excited using the third laser stimulating ray source 3 for emitting a laser beam having a wavelength of 473 nm, the intensity of the stimulating ray is higher than that of an LED and it is therefore possible to release a sufficient amount of fluorescent light from the fluorescent dye.

Fluorescent light released from Fluorescein, which is the fluorescent dye contained in the transfer support 17, enters the light guide 30 and impinges on the filter 32c via the exit end of the light guide 30 under repeated total reflection within the light guide 30. Since the filter 32c has a property to cut off light having a wavelength of 473 nm and transmit light having a wavelength longer than 473 nm and the wavelength of the fluorescent light released from the fluorescent dye is longer than the wavelength of the stimulating ray, only fluorescent light released from Fluorescein is photoelectrically detected by the light detector 31 and is amplified by the amplifier 34 to an electrical signal having a predetermined level. The electrical signal is then converted by the A/D converter 39 to a digital signal with a scale factor suitable for the signal fluctuation width and is stored in the line buffer 36. When the image data corresponding to one scanning line have been stored in the line buffer 36, the line buffer 36 outputs the data to a transmitting buffer 37.

The image data obtained by detecting fluorescent light released from Fluorescein are output from the transmitting buffer 37 to the image processing apparatus 38 and a visual image is displayed on the display means such as a CRT display based thereon. The display image contains an image of the DNA fragments labeled with Fluorescein and the image data produced in the above described manner are stored in an image data storing means (not shown) or are analyzed by an image analyzing apparatus (not shown) as an occasion demands.

On the other hand, when an image of locational information regarding a radioactively labeled substance contained in a gene produced by the Southern blot hybridization method and recorded in the stimulable phosphor layer 21 formed on the stimulable phosphor sheet 22 is to be read, the operator first sets the stimulable phosphor sheet unit 20 on the sample stage 26 of the image reading apparatus 25 so that the stimulable phosphor layer 21 is directed downwardly and is moved to a position where the image carrier unit 12 is located in FIG. 1. Simultaneously, the operator inputs an instruction through the input means 41 that the image carrier is a stimulable phosphor sheet 22. In accordance with the instruction signal input through the input means 41, the control unit 40 outputs a drive signal to the motor 33 to rotate the filter member 32 so that the filter 32d is positioned in front of the light receiving surface of the light detector 31. The control unit 40 then activates the first laser stimulating ray source 1 and turns on the light modulator 18. As a result, a laser beam 4 having a wavelength of 633 nm is emitted from the first laser stimulating ray source 1 and passes through the light modulator 18, the dichroic mirrors 6, 7 and after the beam diameter of the laser beam 4 has been accurately adjusted by the beam expander 8, the laser beam 4 impinges on the polygon mirror 9. The laser beam 4 deflected by the polygon mirror 8 impinges on the scan starting point sensor 14. The gain of the scan starting point sensor 14 has been switched to be a low value G1L by the gain switching means 15 for preventing stray light of the laser beam 4 emitted from the first laser stimulating ray source 1 from being detected. When the scan starting point sensor 14 detects the laser beam 4, it outputs a scanning starting signal to the control unit 40. When the control unit 40 receives the scanning starting signal from the scan starting point sensor 14, it starts producing image data. As the polygon mirror 9 is rotated, the laser beam 4 emitted from the first laser stimulating ray source 1 and deflected by the polygon mirror 9 passes through the fθ lens 10 and is reflected by the reflecting mirror 11, thereby impinging upon the stimulable phosphor layer 21 formed on the stimulable phosphor sheet 22. Since the laser beam 4 is scanned on the stimulable phosphor layer 21 formed on the stimulable phosphor sheet 22 in the main scanning direction indicated by X in FIG. 1, while the stimulable phosphor unit 20 is moved in the sub-scanning direction indicated by Y in FIG. 1, the whole surface of the stimulable phosphor layer 21 formed on the stimulable phosphor sheet 22 is scanned with the laser beam 4.

When the stimulable phosphor layer 21 is scanned with the laser beam 4 having a wavelength of 633 nm in this manner, the stimulable phosphor contained in the stimulable phosphor layer 21 formed on the stimulable phosphor sheet 22 is excited, thereby releasing stimulated emission.

The stimulated emission released from the stimulable phosphor enters the light guide 30 and impinges on the filter 32d via the exit end of the light guide 30 under repeated total reflection within the light guide 30. Since the filter 32d has a property to allow only light of the wavelength region of the stimulated emission released from the stimulable phosphor to pass through and cuts off light having a wavelength of 633 nm, only the stimulated emission released from the stimulable phosphor is photoelectrically detected by the light detector 31. The thus obtained electrical signal is amplified by the amplifier 34 so as to produce an electrical signal of a predetermined level and then converted in the A/D converter 35 to a digital signal with a scale factor suitable for the signal fluctuation width. The image data are further forwarded to the image processing apparatus 38 via the line buffer 36 and the transmitting buffer 37. A visual image is displayed on a display means such as a CRT based on the image data input to the image processing apparatus 38. The thus produced image data are stored in the image data storing means (not shown) or analyzed by the image analyzing apparatus (not shown) as occasion demands.

Further, in the case where an image of DNA fragments of gene labeled with a fluorescent substance and contained in a gel support (not shown) is to be read, the fact that the image carrier is a gel support and the kind of fluorescent substance are input by the operator through the input means 41. When the image carrier is a gel support, since the intensity of fluorescent light released from the gel support is weak, if the power of the laser beam 4 is lowered by the ND filter 13, the detection sensitivity becomes low. Therefore, the control unit 40 outputs a signal to a drive means (not shown) to cause it to retract the ND filter 13 from the optical path of the laser beam 4 and outputs a gain switching signal to the gain switching means 15 to cause it to switch the gain of the scan starting point sensor 14 to a low value G1L, G2L or G3L selected in accordance with the laser stimulating ray source to be used. When DNA fragments of a target gene are labeled with three kinds of fluorescent substances, Fluorescein, Rhodamine B and Cy-5, images of fluorescent substances carried in the gel support are read in the same manner as the transfer support 17 except for the above differences.

According to the above described embodiment, since the intensity of fluorescent light released from a fluorescent substance contained in a transfer support 17 consisting of a membrane upon excitation is high, if the image carrier is the transfer support 17, the laser beam 4 is forced to pass through the ND filter 13, thereby lowering the power of the laser beam 4. However, since the gain of the scan starting point sensor 14 is set to a high value G1H, G2H or G3H by the gain switching means 15 in accordance with the laser stimulating ray source to be used, it is possible to accurately detect the scan starting point in the main scanning direction. In the case where an image of a radioactive labeling substance recorded in the stimulable phosphor layer 21 of the stimulable phosphor sheet 22 is to be read without causing the laser beam 4 to pass through the ND filter 13 or an image of a fluorescent substance contained in the gel support is to be read, since the gain of the scan starting point sensor 14 is set to a low value G1L, G2L or G3L by the gain switching means in accordance with the laser stimulating ray source to be used, it is possible to efficiently prevent the scan starting point sensor 14 from detecting stray light of the laser beam and the scan starting point in the main scanning direction can be therefore accurately detected.

Further, according to the above described embodiment, both the electrophoresis image of DNA fragments labeled with fluorescent dye and recorded in the transfer support 17 and the electrophoresis image of DNA fragments labeled with the radioactively labeled substance and recorded in the stimulable phosphor layer 21 formed on the stimulable phosphor sheet 22 can be read by a single image reading apparatus. The efficiency is therefore high.

Furthermore, in the above described embodiment, since the third laser stimulating ray source 3 for emitting a laser beam having a wavelength of 473 nm is provided for exciting fluorescent dye, the intensity of the stimulating ray is higher than that of an LED and it is therefore possible to generate a sufficient amount of fluorescent light.

Moreover, generally, the wavelength of fluorescent light released from a fluorescent substance upon excitation is slightly longer than that of a stimulating ray. However, according to the above described embodiment, since fluorescent dye designed so as to be efficiently excited by an argon laser is excited by a laser beam 4 of 473 nm shorter than 488 nm which is a wavelength of the argon laser, it is possible to easily cut a stimulating ray using the filter 32c, thereby improving an S/N ratio and enabling an image of a fluorescent dye or a radiation image to be read with high sensitivity.

Further, in the above described embodiment, since the image reading apparatus 25 is provided with the second laser stimulating ray source 3 for emitting a laser beam 4 having a wavelength of 532 nm in addition to the first laser stimulating ray source 1 for emitting a laser beam 4 having a wavelength of 633 nm and the third laser stimulating ray source 3 for emitting a laser beam 4 having a wavelength of 473 nm, it is possible to label a specimen with fluorescent dye excitable with a laser beam 4 having a wavelength of 532 nm and the utility of the fluorescence detecting system can be therefore improved.

Moreover, according to the above described embodiment, when the kind of fluorescent dye is input through the input means 41, the control unit 40 selects a filter suitable for detecting fluorescent light released from the specified fluorescent dye from among the filters 32a, 32b and 32c and position it in front of the light detector 31. The control unit 40 then selects a laser stimulating ray source suitable for exciting the specified fluorescent dye forming a fluorescent image to be read from among the first laser stimulating ray source 1, the second laser stimulating ray source 2 and the third laser stimulating ray source 3 and causes it to emit a laser beam 4, thereby reading a fluorescent image. Or when an instruction that the image carrier is a stimulable phosphor sheet 22 is input through the input means 41, the control unit 40 selects the filter 32d suitable for detecting stimulated emission and positions it in front of the light detector 31. The control unit 40 then activates the first laser stimulating ray source 1 suitable for exciting the stimulable phosphor and causes it to emit a laser beam 4, thereby reading a radiation image. Therefore, the operation is very simple and it is possible to eliminate the risk of erroneously activating the second laser stimulating ray source 2 or the third laser stimulating ray source 3 when a radiation image recorded in the stimulable phosphor layer 21 formed on the stimulable phosphor sheet 22 is to be read. It is therefore possible to eliminate the risk of such an error causing a part of radiation energy stored in the stimulable phosphor layer 21 to be released so that the radiation image cannot be accurately read or cannot be read at all as the case may be.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the electrophoresis image of gene obtained by Southern blot hybridization method is recorded in the transfer support 17 in accordance with a fluorescent detection system and is recorded in the stimulable phosphor layer 21 formed on the stimulable phosphor sheet 22 in accordance with the autoradiographic system and these images are photoelectrically read out. However, the present invention is not limited to such image reading but can also be applied to various other types of image reading. Specifically, the present invention can also be applied to reading of other images of fluorescent substances recorded in a gel support or a transfer support in accordance with the fluorescent detection system or images for the separation or identification of protein or the estimation of molecular weight or properties of protein or the like, autoradiographic images of a protein produced by thin layer chromatography (TLC) and recorded in the stimulable phosphor layer 21 formed on the stimulable phosphor sheet 22, an autoradiographic image produced by polyacrylamide gel electrophoresis for the separation or identification of protein or the estimation of molecular weight or properties of protein or the like and recorded in the stimulable phosphor layer 21 formed on the stimulable phosphor sheet 22, and an autoradiographic image recorded in the stimulable phosphor layer 21 formed on the stimulable phosphor sheet 22 for studying the metabolism, absorption, excretion path and state of a substance introduced into a test mouse. Further, the present invention is applicable to reading of an electron beam transmission image or an electron beam diffraction image of a metal or nonmetal produced by an electron microscope and an electron microscope image of tissue of an organism recorded in the stimulable phosphor layer 21 formed on the stimulable phosphor sheet 22, and a radiographic diffraction image of a metal or nonmetal recorded in the stimulable phosphor layer 21 formed on the stimulable phosphor sheet 22.

Further, in the above described embodiment, although the power of the laser beam 4 is adjusted using the ND filter 13 in accordance with the kind of image carrier, the laser power may be adjusted by employing a semiconductor laser source as a laser stimulating ray source and controlling electrical current supplied to the semiconductor laser source in accordance with the kind of image carrier.

Moreover, in the above described embodiment, although only a laser beam 4 emitted from the first laser stimulating ray source 1 passes through the light modulator 18, the power of the laser beam 4 may be adjusted by causing laser beams 4 emitted from the second laser stimulating ray source 2 and the third laser stimulating ray source 3 to pass through the light modulator and controlling the voltage of the light modulator.

Further, in the above described embodiment, although the image reading apparatus includes the second laser stimulating ray source 2 for emitting a laser beam 4 having a wavelength of 532 nm, the second laser stimulating ray source 2 is not absolutely necessary.

Furthermore, in the above described embodiment, although the He-Ne laser is used as the first laser stimulating ray source 1 for emitting a laser beam 4 having a wavelength of 633 nm, a semiconductor laser source for emitting a laser beam having a wavelength of 635 nm may be employed instead of the He-Ne laser.

Moreover, in the above described embodiment, although the laser beam source for emitting a laser beam 4 having a wavelength of 633 nm, the laser beam source for emitting a laser beam 4 having a wavelength of 532 nm and the laser beam source for emitting a laser beam 4 having a wavelength of 473 nm are respectively used as the first laser stimulating ray source 1, the second laser stimulating ray source 2 and the third laser stimulating ray source 3, a laser beam source for emitting a laser beam 4 having a wavelength of 635 nm may be used for the first laser stimulating ray source 1 instead of the laser beam source for emitting a laser beam 4 having a wavelength of 633 nm and a laser beam source for emitting a laser beam 4 having a wavelength of 530 nm to 540 nm and a laser beam source for emitting a laser beam 4 having a wavelength of 470 nm to 480 nm may be used for the second laser stimulating ray source 2 and the third laser stimulating ray source 3 respectively.

Further, in the above described embodiments, although the light guide 30 made by processing a non-fluorescent glass or the like is employed, the light guide 30 is not limited to one made of a non-fluorescent glass but a light guide made by processing synthesized crystal, a transparent sheet such as an acrylic synthetic resin sheet or the like may be used.

Furthermore, in the above described embodiment, when a fluorescent image recorded in the transfer support 17 is read, the kind of fluorescent dye is input through the input means 41 and when a radiation image recorded in the stimulable phosphor layer 21 formed on the stimulable phosphor sheet 22 is read, an instruction that the image carrier is a stimulable phosphor sheet is input through the input means 41, whereby the control unit 40 automatically selects one of the laser stimulating ray sources 1, 2, 3, one of the filters 32a, 32b, 32c, 32d. However, the kinds of instruction signals for causing the control unit 40 to effect such automatic selection can be arbitrarily determined and it is not necessary to input the kinds of fluorescent dye or that the image carrier is a stimulable phosphor sheet.

Moreover, in the above described embodiments, although the image reading apparatus includes the light modulator 18 and it is preferable to provide the light modulator 18 in the case where the laser stimulating ray sources have to be frequently switched, for example, in the case where the transfer support 17 is scanned using different laser stimulating ray sources every scanning line. However, the light modulator 18 is not absolutely necessary in the case where the laser stimulating ray sources do not have to be frequently switched, for example, in the case where the whole surface of the transfer support 17 is scanned using one of the first laser stimulating ray source 1, the second laser stimulating ray source 2 and the third laser stimulating ray source 3 and then scanned using another laser stimulating ray source.

According to the present invention, it is possible to provide an image reading apparatus which can be used for a radiation diagnosis system, an autoradiographic system, an electron microscope detecting system and a radiation diffraction image detecting system using a stimulable phosphor and a fluorescence detecting system and can accurately detect a scan starting point in a main scanning direction of a laser beam to read an image.

What is claimed is:

1. An image reading apparatus comprising at least one laser stimulating ray source for emitting a laser beam, a laser beam scanning means for scanning the laser beam, a light detection means for photoelectrically detecting light released from an image carrier carrying an image, a scan starting point detecting means for detecting the laser beam and detecting a scan starting point in a main scanning direction, a laser power adjusting means for adjusting power of the laser beam to be projected onto the image carrier in accordance with the kind of the image carrier and a gain switching means for switching gain of the scan starting point detecting means in accordance with the kind of the laser beam and the kind of the image carrier.

2. An image reading apparatus in accordance with claim 1 wherein the laser power adjusting means is constituted so as to adjust the power of the laser beam by positioning an ND filter in an optical path of the laser beam and retracting it from the optical path of the laser beam.

3. An image reading apparatus in accordance with claim 2 wherein the at least one laser stimulating ray source includes a first laser stimulating ray source for emitting a laser beam having a wavelength of 633 nm or 635 nm and a second laser stimulating ray source for emitting a laser beam having a wavelength of 470 nm to 480 nm and the image carrier to be scanned with the laser beam emitted from the first laser stimulating ray source is constituted by a carrier carrying an image of fluorescent substances or a stimulable phosphor sheet containing a stimulable phosphor recording an image selected from the group consisting of a radiation image, an autoradiographic image, a radiographic diffraction image and an electron microscope image of an object and the image carrier to be scanned with the laser beam emitted from the second laser stimulating ray source is constituted by a carrier carrying an image of fluorescent substances.

4. An image reading apparatus in accordance with claim 3 wherein the at least one laser stimulating ray source further includes a third laser stimulating ray source for emitting a laser beam having a wavelength of 530 to 540 nm and the image carrier to be scanned with the laser beam emitted from the third laser stimulating ray source is constituted by a carrier carrying an image of fluorescent substances.

5. An image reading apparatus in accordance with claim 1 wherein the at least one laser stimulating ray source is constituted as a semiconductor laser source and the laser power adjusting means is constituted so as to adjust the power of the laser beam by controlling electrical current supplied to the semiconductor laser source.

6. An image reading apparatus in accordance with claim 5 wherein the at least one laser stimulating ray source includes a first laser stimulating ray source for emitting a laser beam having a wavelength of 633 nm or 635 nm and a second laser stimulating ray source for emitting a laser beam having a wavelength of 470 nm to 480 nm and the image carrier to be scanned with the laser beam emitted from the first laser stimulating ray source is constituted by a carrier carrying an image of fluorescent substances or a stimulable phosphor sheet containing a stimulable phosphor recording an image selected from the group consisting of a radiation image, an autoradiographic image, a radiographic diffraction image and an electron microscope image of an object and the image carrier to be scanned with the laser beam emitted from the second laser stimulating ray source is constituted by a carrier carrying an image of fluorescent substances.

7. An image reading apparatus in accordance with claim 6 wherein the at least one laser stimulating ray source further includes a third laser stimulating ray source for emitting a laser beam having a wavelength of 530 to 540 nm and the image carrier to be scanned with the laser beam emitted from the third laser stimulating ray source is constituted by a carrier carrying an image of fluorescent substances.

8. An image reading apparatus in accordance with claim 1 wherein a light modulator is further provided and the laser power adjusting means is constituted so as to adjust the power of the laser beam by controlling voltage applied to the light modulator.

9. An image reading apparatus in accordance with claim 8 wherein the at least one laser stimulating ray source includes a first laser stimulating ray source for emitting a laser beam having a wavelength of 633 nm or 635 nm and a second laser stimulating ray source for emitting a laser beam having a wavelength of 470 nm to 480 nm and the image carrier to be scanned with the laser beam emitted from the first laser stimulating ray source is constituted by a carrier carrying an image of fluorescent substances or a stimulable phosphor sheet containing a stimulable phosphor recording an image selected from the group consisting of a radiation image, an autoradiographic image, a radiographic diffraction image and an electron microscope image of an object and the image carrier to be scanned with the laser beam emitted from the second laser stimulating ray source is constituted by a carrier carrying an image of fluorescent substances.

10. An image reading apparatus in accordance with claim 9 wherein the at least one laser stimulating ray source further includes a third laser stimulating ray source for emitting a laser beam having a wavelength of 530 to 540 nm and the image carrier to be scanned with the laser beam emitted from the third laser stimulating ray source is constituted by a carrier carrying an image of fluorescent substances.

11. An image reading apparatus in accordance with claim 1 wherein the at least one laser stimulating ray source includes a first laser stimulating ray source for emitting a laser beam having a wavelength of 633 nm or 635 nm and a second laser stimulating ray source for emitting a laser beam having a wavelength of 470 nm to 480 nm and the image carrier to be scanned with the laser beam emitted from the first laser stimulating ray source is constituted by a carrier carrying an image of fluorescent substances or a stimulable phosphor sheet containing a stimulable phosphor recording an image selected from the group consisting of a radiation image, an autoradiographic image, a radiographic diffraction image and an electron microscope image of an object and the image carrier to be scanned with the laser beam emitted from the second laser stimulating ray source is constituted by a carrier carrying an image of fluorescent substances.

12. An image reading apparatus in accordance with claim 11 wherein the at least one laser stimulating ray source further includes a third laser stimulating ray source for emitting a laser beam having a wavelength of 530 to 540 nm and the image carrier to be scanned with the laser beam emitted from the third laser stimulating ray source is constituted by a carrier carrying an image of fluorescent substances.

* * * * *